United States Patent [19]
Wodecki

[11] Patent Number: 5,371,355
[45] Date of Patent: Dec. 6, 1994

[54] NIGHT VISION DEVICE WITH SEPARABLE MODULAR IMAGE INTENSIFIER ASSEMBLY

[75] Inventor: Norm Wodecki, Phoenix, Ariz.
[73] Assignee: Litton Systems, Inc., Woodland Hills, Calif.
[21] Appl. No.: 100,046
[22] Filed: Jul. 30, 1993
[51] Int. Cl.$^5$ .............................................. H01J 40/14
[52] U.S. Cl. .................. 250/214 VT; 313/523
[58] Field of Search ............ 250/214 VT; 359/353, 359/355, 409; 361/731, 732; 313/523, 524, 525, 532

[56] References Cited

U.S. PATENT DOCUMENTS 5,077,611 12/1991 Phillips et al. ............... 250/214 VT
5,118,925 6/1992 Mims et al. ................. 250/214 VT

*Primary Examiner*—David C. Nelms
*Assistant Examiner*—K. Shami
*Attorney, Agent, or Firm*—Poms, Smith, Lande & Rose

[57] ABSTRACT

A night vision device with a modular assembly includes an image intensifier module or assembly, which includes an image intensifier tube and a power supply. The image intensifier tube receives low-level light from a scene too dark to be viewed with the unaided eye, and provides a visible representative image of the scene in phosphor yellow/green light. The power supply receives low-voltage power from a source, such as a battery, and provides power at voltages appropriate for operation of the image intensifier tube. The module includes a separable high-voltage connector for electrically connecting the power supply to the image intensifier tube. According to a preferred embodiment of the invention, the connector includes structure for physically connecting the power supply and image intensifier tube in separable nested relationship while also providing environmental protection to electrical connector features of the module.

38 Claims, 2 Drawing Sheets

NIGHT VISION DEVICE WITH SEPARABLE MODULAR IMAGE INTENSIFIER ASSEMBLY

BACKGROUND OF THE INVENTION

1. Field of the Invention

The present invention relates to night vision devices. More particularly, the present invention relates to a night vision device which includes a separable modular assembly including an image intensifier tube and a high-voltage power supply circuit for the intensifier tube. The separable modular assembly provides high-voltage connection between the power supply and the image intensifier tube, and also physically connects these modular components separably while providing shielding, sealing, and environmental protection to high-voltage electrical connector features of the modules.

2. Related Technology

A conventional night vision device is known as the AN/PVS-7B. This night vision device includes a housing with a single objective lens through which is received low-level light from a scene too dark to be viewed with the unaided eye. The housing of the conventional AN/PVS-7B also included an image intensifier tube which provides an image in phosphor yellow/green light representative of the low-level scene. An image splitter and a pair of eye pieces allow the user of the device to view the intensified image with each eye.

The conventional AN/PVS-7B also includes a battery providing electrical power to the device, and a high-voltage power supply circuit which converts the comparatively low voltage power from the battery to high-voltage levels appropriate for operation of the image intensifier tube.

Conventionally, the image intensifier tube and power supply of night vision devices are combined and are encapsulated into a single module by the use of potting compound. Generally, this module is referred to as the image intensifier module, or IIM. This current technology for making night vision devices involves a multi-stage, labor intensive manufacturing process. As a first step in the conventional manufacturing process for an IIM, the electrical contacts at tabs and flanges of the image intensifier tube are soldered to leads from the high-voltage power supply. Next, the image intensifier tube is given a conformal coating of RTV, or room-temperature-vulcanizing silicone potting compound. As so connected, the image intensifier tube and power supply are inserted into a housing which is held within a mold. The housing is filled with a potting compound. Next, a back plate is placed on the assembly, and is sealed into place using additional RTV compound.

With the conventional IIM, if subsequent testing reveals a defect in either the image intensifier tube, or in the high-voltage power supply circuit; or if, for example, something as simple as one of the electrical connections between these components having a defect, such as a cold solder joint, then the encapsulated IIM module must be destructively taken apart before access to the components can be achieved. Of course, irreparable damage to the power supply or to the image intensifier tube, or to both, is very likely to result from such destructive disassembly of the IIM. However, the only alternative is to throw away defective IIM modules with their expensive power supplies, and very expensive image intensifier tubes. Such disposal of component parts which may have only a minor and easily repairable defect is a great waste incident from the conventional technology for making IIM's.

SUMMARY OF THE INVENTION

In view of the above, a primary object for the present invention is to provide a night vision device with a separable modular assembly.

Additionally, an object for this invention is to provide a night vision device with a separable modular assembly which includes an image intensifier tube, a high-voltage power supply, and separable high-voltage interface with connector features for electrically connecting the power supply to the image intensifier tube.

Still additionally, an object for the present invention is to provide such a night vision device in which the modular assembly further includes features providing environmental protection to the high-voltage connector features of the separable module.

Yet another object for the present invention is to provide such a modular assembly for a night vision device in which the high-voltage connector features are arranged and configured to inhibit and prevent high-voltage current leakage between the connectors.

Accordingly, the present invention provides an image intensifier assembly including an image intensifier tube having electrical high-voltage contacts thereon, a high-voltage power supply having electrical leads corresponding to the high-voltage contacts, and separable high-voltage connector structure for electrically connecting the contacts of the image intensifier tube with the corresponding leads of the power supply.

Additionally, the present invention provides a night vision device having such an image intensifier assembly.

Still additionally, the present invention provides an image intensifier assembly in which the modular assembly includes features for environmentally protecting the high-voltage electrical connector features when the parts of the modular assembly are engaged with one another.

Additional objects and advantages of the present invention will appear from a reading of the following detailed description of a single preferred exemplary embodiment of the present invention, taken in conjunction with the following drawing Figures in which like reference numerals refer to the same feature, or to features which are analogous in structure or function.

DESCRIPTION OF THE DRAWING FIGURES

FIG. 1 provides a fragmentary perspective view of a human user wearing a helmet which carries a support structure supporting a night vision viewer in front of the user's eyes;

Figure 3:
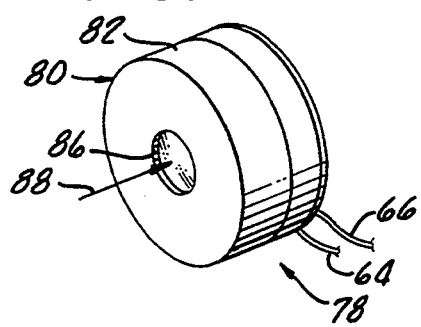
FIG. 3 is a perspective view of a modular image intensifier module (IIM) of the night vision viewer seen in FIG. 1, showing an input end of the module.
Figure 4:
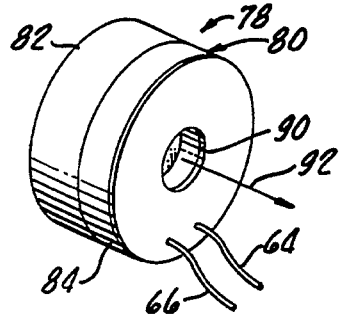
FIG. 4 is a perspective view of the IIM seen in FIG. 3, and showing the opposite output end of the module.
Figure 5A:
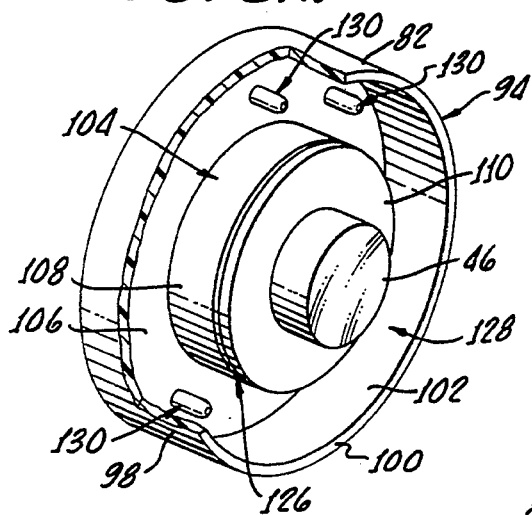
Figure 5B:
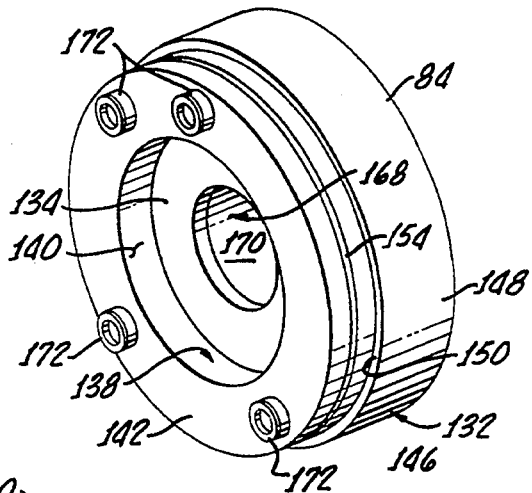
Figure 6:
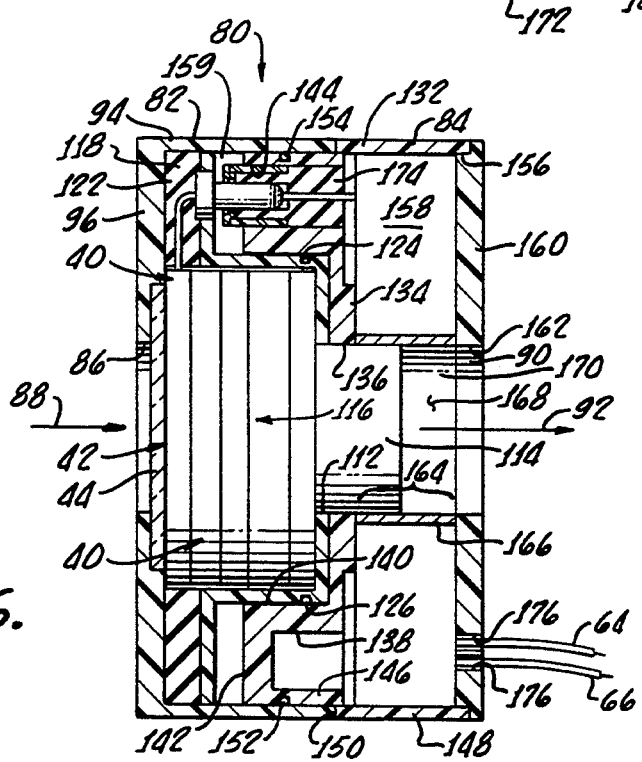

FIGS. 5A and 5B comprise an exploded perspective assembly view of the modular IIM seen in FIGS. 3 and 4, with the modular image intensifier module and power supply circuit module separated to better depict salient features of the invention; and FIG. 6 is a partially cross sectional elevation view of the modular IIM seen in the other drawing Figures.

DESCRIPTION OF THE PREFERRED EMBODIMENT

Figure 1:
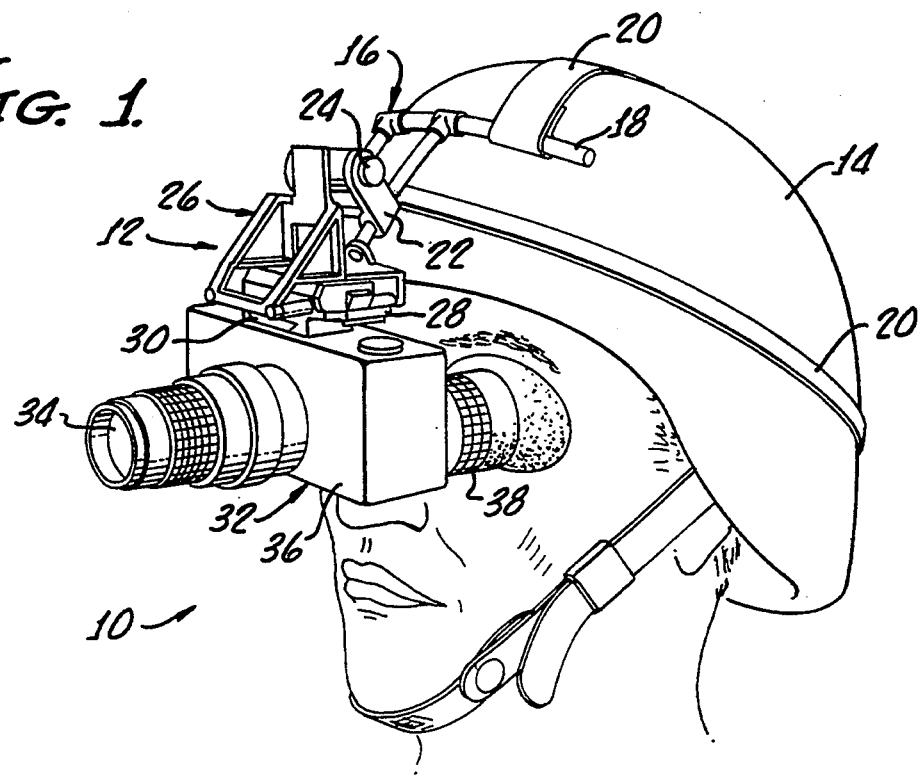
Figure 2:
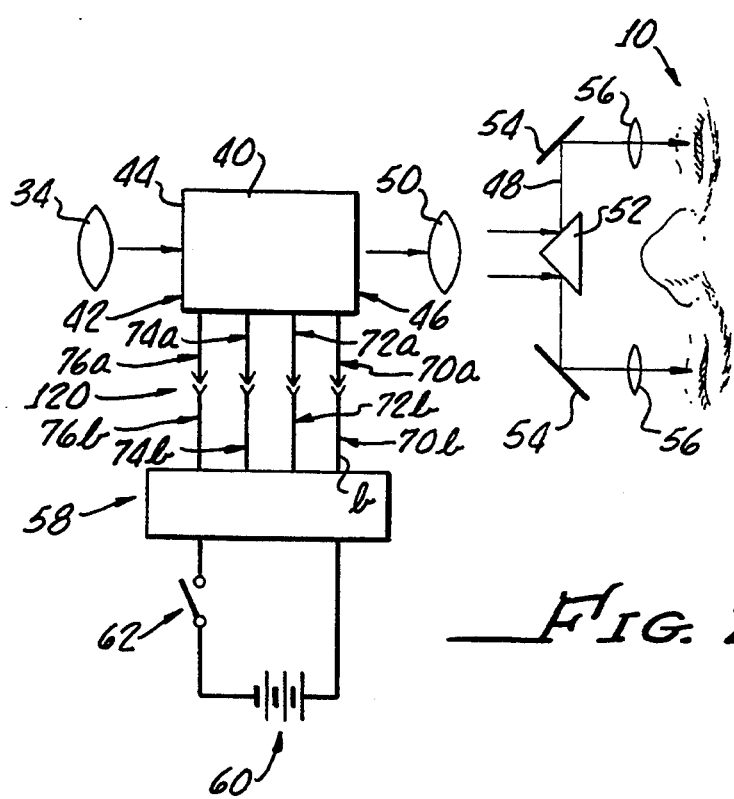
FIG. 2 is a schematic representation of the optical and electrical components of the night vision viewer seen in FIG. 1.

Referring first to FIGS. 1, and 2 in conjunction, an operator 10 is shown using a night vision device 12. The operator 10 wears a helmet 14 carrying a support structure portion 16 of the night vision device 12. This support structure 16 includes a frame 18 secured to the helmet 14 with various straps 20 and having a forwardly and upwardly extending clevis 22. The clevis 22 carries a hinge pin 24 (best seen in FIG. 2) for a flip up mount portion 26 of the support structure 16. Consequently, the flip up mount portion 26 of the support structure 16 is hinged on the clevis 22 for pivotal movement about hinge pin 24. The flip up mount portion 26 carries a carriage 28 and a coupling device 30. A night vision viewer 32 is suspended from the support structure 16 at the coupling device 30. This night vision viewer 32 is of goggle configuration and includes a single objective lens 34, a housing 36, and a pair of eye pieces 38 aligned with respective eyes of the operator 10.

To use the night vision viewer 32, the operator 10 places it in the use position depicted in FIGS. 1, and looks into eye pieces 38 to see an enhanced image representative of the low-level light from a scene which is too dim to view with the unaided eye. The low-level light from this dim scene has entered objective lens 34. As those ordinarily skilled in the pertinent arts will appreciate, behind the objective lens 34, the night vision viewer 32 includes an image intensifier tube which is generally referenced with the numeral 40 on the schematic representation of FIG. 2.

This image intensifier tube 40 has at an input end 42 thereof a window 44 (seen in FIG. 3) leading to a photoelectrically responsive photocathode (not shown). When photons from a dimly lighted scene impact the photocathode, electrons are knocked free and travel to a microchannel plate (also not shown). The microchannel plate includes multiple small channels which have interior surfaces coated with a material prone to emission of secondary electrons. Thus, when a photoelectron from the photocathode falls into one of the microchannels, a larger number of secondary electrons exit from the channel along with the photoelectron. This electron shower, in a pattern replicating the image of the dimly lighted scene, is directed to a phosphorescent screen (not shown) where it produces a visible image in yellow/green light. From the phosphorescent screen the image is directed through a fiber optic invertor bundle (depicted in later drawing Figures) and exits form a rear surface 46 of the image intensifier tube 40.

The night vision viewer 32 includes a bifurcated optical pathway 48 including a collimator lens 50, a splitter 52, a pair of intermediate lenses 53 and corner mirrors 54, and a pair of eye piece lenses 56. Therefore, the user 10 may look into the eye pieces 38 and see a complete image of the low-level scene with each eye.

Still viewing FIG. 2, it is seen that the night vision viewer 32 includes a power supply for the image intensifier tube 40, which power supply is generally referenced with the numeral 58. This power supply 58 includes a battery 60 connected by a single pole, single throw switch 62, and a pair of low-voltage connector leads 64, 66, to a power supply circuit, which is referenced with the numeral 68. This power supply circuit 68 is of the voltage converter type which converts the comparatively low voltage direct current power from the battery 60 into direct current power at sequentially higher voltages at three high-voltage leads, as will be explained.

As a threshold observation, it is noted that the power supply circuit 68 includes a ground lead 70, which is connected to the phosphorescent screen of the image intensifier tube 40 to drain the current flow resulting from the electron shower falling on this screen. The power supply 58 also includes three high-voltage leads 72, 74, and 76, which carry progressively higher voltage levels, and which are individually connected, respectively, to the rear ends of the microchannels in common, to the front ends of the microchannels in common, and to the photocathode. Accordingly, it is easily appreciated that the image intensifier tube 40 is subject to a high voltage gradient being most negative at the forward end of the tube and most positive (or at ground potential) at the rear (phosphorescent screen) end of this tube. This high voltage gradient moves photoelectrons, and secondary emission elections, from the photocathode and microchannel plate, respectively, to the phosphorescent screen to create an image when the switch 62 is closed.

Now viewing FIGS. 3, 4, 5, and 6, in conjunction, it is seen that the night vision viewer 32 includes a modular assembly, referenced with the numeral 78. This modular assembly 78 includes a nested two-piece housing 80, having a forward modular part 82 housing the image intensifier tube 40, and a rear modular part 84 housing the power supply circuit 68. That is, the forward modular housing part 82 defines an opening 86 admitting low-level light, as is indicated with arrow 88 viewing FIG. 3, to the input end 42 and window 44 of the image intensifier tube 40 (not seen in FIG. 3, but housed within the module 82). Similarly, the rear modular housing part 84 defines an opening 90 from which issues the yellow/green light forming a visible image for the user of the night vision viewer 32, as is indicated by arrow 92, viewing FIG. 4. Also, the low-voltage leads 64, 66, extend from the rear modular housing part 84 for connection with the battery 60 and switch 62, as explained above.

Viewing FIGS. 5A and 5B in conjunction with FIG. 6, it is seen that the forward module part 82 of the modular housing 78 includes a rearwardly opening cup-shaped annular portion 94, with an end wall 96 defining the opening 86, and a side wall 98 extending axially. The side wall 98 defines a rearwardly disposed opening 100 to the interior 102 of the housing portion 94. Received into the interior 102 of the housing part 82 is a stepped flange member 104. This stepped flange member 104 includes a radially outer and radially extending flange portion 106, an axially extending cylindrical portion 108, and a radially inner and radially extending portion 110. The portion 110 defines an opening 112 through which rearwardly extends the fiber optic image invertor part 114 of the image intensifier tube 40.

More particularly, the forward housing portions 94 and 104 cooperatively define a chamber 116 in which the image intensifier tube 40 is received. This chamber 116 includes an outer radially extending portion 118 within which respective parts 70a–76a of the high voltage leads 70–76 extend (only one of the lead parts being visible in FIG. 6). Also received in the chamber portion 118 is a forward part of a respective high-voltage connector, generally referenced with the numeral 120, which will be further described. Each of the lead parts 70a–76a in the chamber 118 is terminated in a respective high-voltage connector 120. The remaining space in chamber 116, including all of the portion 118 thereof, is filled with a potting compound, indicated on FIG. 6 with the numeral 122.

Outwardly, the stepped flange member 104 defines a radially outwardly disposed circumferential groove 124 on the cylindrical portion 108. This groove 124 receives an elastomeric O-ring type of sealing member 126. Rearwardly of the flange member 104, the cup shaped housing portion 94 defines a rearwardly opening and axially extending annular stepped recess, generally referenced with the numeral 128. From the radially outer flange portion 106 of the stepped flange member 104, the male connector portions 130 of the connectors 120 extend into the recess 128.

Nested with the forward modular housing part 82, in the annular recess 128 as seen in FIGS. 3, 4, and 6, the rear part 84 of the housing 80 also includes a rearwardly opening annular cup-shaped part 132. This cup-shaped part 132 includes a radially inner annular wall portion 134 which defines an opening 136 coaxial with and receiving the image invertor part 114 of the image intensifier tube 40. Forwardly from the outer periphery of the wall portion 134 the rear cup-shaped part 132 includes a forwardly extending cylindrical wall portion 138. This cylindrical wall portion 138 defines a radially inner surface 140 which is engaged by the O-ring sealing member 126. Forwardly of the cylindrical wall portion 138, the cup-shaped part 132 includes a radially extending annular wall part 142, which defines openings 144 aligned with the male connector parts 130.

Rearwardly from the outer periphery of the radial wall portion 142 (that is, to the right viewing FIG. 6), the cup-shaped part 132 includes a smaller diameter axially extending outer cylindrical wall portion 146, leading to a rearward axially extending larger-diameter outer cylindrical wall portion 148. The wall portions 146 and 148 cooperatively define a step 150 therebetween. This step 150 confronts the aft end of the side wall portion 98 of the forward modular housing part 82 when the housing parts are nested together as is illustrated in FIG. 6. The smaller diameter wall portion 146 defines a radially outwardly opening circumferential groove 152, which receives an elastomeric O-ring type of sealing member 154. Also, the larger diameter wall portion 148 defines a rearwardly disposed axial opening 156. This opening 156 leads forwardly into an axially extending annular chamber 158, the function of which will be further described. When the housing parts 82 and 84 are nested together, as illustrated in FIG. 6, the sealing member 154 sealingly engages the side wall 98 of the forward housing part 82. Consequently, when these housing parts 82 and 84 are nested together they cooperatively define an annular high-voltage interface chamber 159 which is environmentally protected and sealingly isolated from ambient.

At the opening 156, the side wall portion 148 sealingly carries an annular end plate, generally referenced with the numeral 160. This end plate 160 defines a central opening 162, which is spaced axially from the inner wall portion 134 to define an axially extending annular gap or radially inwardly directed opening 164 from the chamber 158. In the annular chamber 158 is disposed the power supply circuit 68, which is configured also to be annular, or to be circumferentially extending in the annular chamber 158. This power supply circuit is not detailed in the drawing Figures other than to illustrate that it includes a tubular member 166 defining a radially inwardly disposed cooling surface 168 which fills the gap 164, and defines a passage 170 opening rearwardly from the rear surface 46 of the image intensifier tube 40 between the opening 136 of inner wall portion 134 and the central opening 162 of the end plate 160. The tubular member 166 is sealingly attached to the rear modular housing part 84 so that the chamber 158 is sealingly isolated from the environment.

As can be seen viewing FIG. 6, the power supply circuit 68 includes leads 70b–76b (only one of which is shown in FIG. 6), which extend forwardly in the chamber 158 to corresponding female high-voltage connector portions 172. That is, each of the leads 70–76 includes a male connector portion 130 carried by the forward module 82, and a female connector portion 172 carried by the rear module 84. Viewing the schematic representation of FIG. 2, these connectors in the leads 70–76 are depicted by the paired diagonal lines intermediate the length of these leads and generally referenced with the arrowed numeral 120. The remaining volume of chamber 158 is filled with a potting compound, which is indicate with the numeral 174, viewing FIG. 6. Also viewing FIG. 6, it is seen that the low-voltage leads 64, 66 exit the chamber 158 vis small holes 176 provided in the end plate portion 160. The potting compound 176 provides a seal at these holes 176 so that the chamber 158, and the power supply circuit 68 therein is environmentally protected and isolated.

Viewing FIGS. 5A and 5B, it is seen that the high-voltage connectors 130 and 172 are arranged in complementary patterns on each of the modules 82 and 84 in order to allow their physical engagement and electrical connection when the modules 82 and 84 are nested, as is depicted in FIG. 6. Preferably, the connectors 130 and 172 are arranged to dispose the ground lead 70 at the greatest possible distance from the highest voltage lead 76, with the intermediate voltage leads 72 and 74 disposed in between these leads. That is, viewing FIGS. 5, the connector 172 for ground lead 70 is referenced with the numeral 70'. Diametrically opposite to the connector 70' is disposed the connector 172 for lead 76, which is referenced with the numeral 76'. The lead 74, which has the next highest voltage, is arranged with its connector 172, as indicated at 74', forty five degrees of arc from the connector 76'. Finally. the lead 72' having the lowest voltage is arranged with its connector 172 disposed at ninety degrees of arc between the connectors 70' and 76'. This arrangement of the connectors 130, 172 polarizes the modules 82, 84 so that they can only be nested together in one orientation which properly connects the leads 70–76, and also insures that high voltage currents do not leak between the connectors 130, 172. Further, it is seen that the male connectors 130 on the modular housing part 82 are arranged in the recess 128 around the axially extending cylindrical portion 108 of the flange member 104. That is, the flange member 104 in effect includes an axially extending boss which is interposed between the connectors 130. To appreciate the effect of this axially extending boss, it may be realized that in order for a high-voltage current to leak from the highest voltage connectors (on lead 76) to the ground potential connectors (on lead 70), the current can not simply travel the diametral distance between these connectors, but must travel the larger circumferential distance around the portion 108 of the flange member 104. Thus, the possibility of high-voltage leakage currents is further decreased.

As those who are ordinarily skilled in the pertinent arts will recognize, a great challenge to be overcome in order to realize the present invention was the miniaturization of the high-voltage interface between the modules 82, and 84, while still providing insurance against voltage leaks in the use environment of the night vision viewer 32. That is, the viewer 32 may be exposed to moisture, humidity, dust, and other contaminants, which if they were allowed to reach the high-voltage interface between the power supply circuit 68 and the image intensifier tube 40, would disrupt or interfere with this high voltage supply. That is, moisture and dust could cause a high voltage leak or surface voltage discharge between one of the high-voltage leads 72–76 and the ground lead 70, or to other low-potential objects including the user 10, sufficient to prevent the operation of the viewer 32. Alternatively, the viewer 32 could be damaged, or possibly the user 10 could receive a shock from the viewer 32. In order to prevent all of these undesirable and possibly dangerous consequences of high-voltage leakage, and in addition to the shielding and protection of the high-voltage interface in chamber 159 which is effected by the nesting of the modules 82, 84, the present invention provides sealing isolation of this interface chamber with use of the seals 126 and 154, and also provides a polarized arrangement of the connectors 130 and 172 which preferably separates these connectors according to their respective voltage differentials. That is, the connectors with the highest voltage differential are separated by the greatest distances in the polarizing pattern. Consequently, even in the unlikely event that moisture or dust or other contamination does enter the high-voltage interface chamber 159, the chances of a high-voltage leak developing among the leads 70–72 is reduced. The nesting and sealingly cooperating relationship of the modular housing portions 82, and 84 also serve to protect the user 10 of the viewer 32 from high-voltage shock. That is, even if a high-voltage leak were to be developed between the leads 70–76 in the high-voltage interface chamber 159, the voltage would not escape to shock the user 10 because of the seals 126, 154, and the nesting relationship of the housing portions 82, and 84.

In view of the above, the Applicant believes that a variety of high-voltage connectors could be used to provide the male and female connector portions 130 and 172 as described above. Particularly, a commercially available high-voltage connector known as a "Pee-Wee" connector has been successfully used in an actual reduction to practice of the invention substantially as described herein. These "Pee-Wee" connectors are available from Reynolds Incorporated, as part numbers 178-8172-6N (130 herein), and 178–7937 (panel connector) 172 herein). This commercially available connector is rated to 10,000 volts, and is additionally shielded and sealingly isolated form the ambient and other environmental influences by the nested relationship of the housing portions 82 and 84, as described above.

With an image intensifier module according to the present invention, manufacturing of the image tube module 82 and power supply module 84 are separate processes. These modules do not need to be associated with one another until they have been completely manufactured, and tested. If a defect is discovered during the manufacture and after encapsulation of either the image tube module or the power supply module, destructive opening of the capsule places only a single power supply or image tube (rather than both of these assemblies) at risk. Subsequently, as a later manufacturing step a complete image intensifier module is formed simply be nesting the image tube module and power supply module with one another.

Further, if a defect develops with either the image tube module or power supply module during the use of a night vision device including the image intensifier module, then the image tube module and power supply module can be unnested from one another, the defective module replaced, and operation of the night vision viewer restored by nesting a working replacement module with the original module which is still in working condition. This type of simplified repair was simply not possible with night vision devices using image intensifier modules according to the conventional technology. These conventional devices required replacement of the complete and expensive image intensifier module.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, while the present invention is illustrated and depicted in the context of an AN/PVS-7B type of night vision device, the invention is equally applicable to other types of night vision devices. Accordingly, the present invention is equally applicable to other types of night vision devices. It follows necessarily that the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:
1. An image intensifier assembly comprising:
   an image intensifier tube having electrical contacts;
   a high-voltage power supply having high-voltage leads corresponding to said electrical contacts of said image intensifier tube; and
   separable high-voltage connector means for electrically connecting each of said high-voltage leads to a corresponding electrical contact of said image intensifier tube.

2. The image intensifier assembly of claim 1 wherein said separable high-voltage connector means includes a first and a second modular housing portions each respectively receiving one of said image intensifier tube and said high-voltage power supply, each of said first and said second modular housing portions carrying respective high voltage connector features engageable with one another to electrically connect said leads of said high-voltage power supply with said contacts of said image intensifier tube and separable to facilitate separation of said modular housing portions.

3. The image intensifier assembly of claim 2 wherein said first and said second modular housing portions are configured to nest with one another.

4. The image intensifier assembly of claim 3 wherein said first and said second modular housing portions when nested together effect electrical engagement of said high-voltage connector features.

5. The image intensifier assembly of claim 4 wherein said first and said second modular housing portions nest together to cooperatively define a high-voltage interface chamber, said high-voltage connector features being engaged with one another in said high-voltage interface chamber.

6. The image intensifier assembly of claim 5 wherein said high-voltage connector features are so disposed in said high-voltage interface chamber to polarize said first and said second modular housing portions to a singular relative position for nesting together.

7. The image intensifier assembly of claim 6 wherein said high-voltage interface chamber includes an axially extending boss feature interposing between said high-voltage connector features to inhibit high-voltage leakage currents therebetween.

8. The image intensifier assembly of claim 2 wherein said first modular housing portion defines a respective first chamber receiving said image intensifier tube, said first chamber further receiving electrical leads connecting said electrical contacts of said image intensifier tube to said respective high-voltage connector features.

9. The image intensifier assembly of claim 8 wherein said first modular housing portion includes a respective first cup-shaped housing part defining an interior space, and a flange member received into said interior space to cooperatively define said chamber of said first modular housing portion.

10. The image intensifier assembly of claim 9 wherein said first cup-shaped housing part and said flange member cooperatively define and axially extending and rearwardly opening recess into which said second modular housing portion may nest.

11. The image intensifier assembly of claim 10 wherein said axially extending recess is annular to circumscribe a boss of said first modular housing portion.

12. The image intensifier assembly of claim 11 wherein respective said high-voltage connector features are disposed axially at a forward end of said recess.

13. The image intensifier assembly of claim 2 wherein said second modular housing portion defines a respective second chamber receiving said high-voltage power supply, said second chamber also receiving said high-voltage leads connecting said high-voltage power supply to said respective high-voltage connector features.

14. The image intensifier assembly of claim 13 wherein said second modular housing portion is toroid-shaped to be nested axially at least in part into an annular recess defined by said first modular housing portion.

15. The image intensifier assembly of claim 13 wherein said second modular housing portion includes a respective second cup-shaped annular housing member defining a respective annular chamber, an end plate member cooperating with said second cup-shaped member to close said annular chamber, and said high-voltage power supply including a power supply circuit disposed in said annular chamber.

16. The image intensifier assembly of claim 15 wherein said annular chamber circumscribes a portion of said image intensifier tube when said first and said second modular housing portions are nested together to connect said high-voltage connector features.

17. An image tube module comprising:
an image intensifier tube having high-voltage electrical contacts; a module housing portion defining a chamber receiving said image intensifier tube; and high-voltage connector means carried by said module housing portion and electrically connecting with said high-voltage electrical contacts of said image intensifier tube for individually connecting with a high-voltage power supply.

18. The image tube module of claim 17 wherein said image tube module is configured to define an annular recess, said high-voltage connector means being disposed in said annular recess.

19. The image tube module of claim 18 wherein said image intensifier tube includes a rear face from which issues an intensified image, said rear face being centrally located of said annular recess.

20. The image tube module of claim 19 wherein said module housing portion includes an axially extending wall portion circumscribing said annual recess, said axially extending wall portion being sealingly cooperable with a power supply module portion receivable into said annular recess to sealingly isolate said high-voltage connector means from ambient.

21. For a modular image intensifier assembly, a power supply module comprising:
a power supply circuit having high-voltage leads;
a modular housing portion receiving said power supply circuit; and
high-voltage connector means carried by said modular housing portion and electrically connecting individually with said high-voltage power supply leads for separably connecting with an image intensifier tube.

22. The power supply module of claim 21 wherein said modular housing portion is configured as a torus circumscribing an optical output of said image intensifier tube.

23. The power supply module of claim 22 wherein said modular housing portion includes an axially extending wall portion sealingly cooperable with an image tube module to sealingly isolate said high-voltage connector means from ambient.

24. An image intensifier module for a night vision device, said image intensifier module including:
an image intensifier tube having high-voltage electrical contacts;
a high voltage electrical power supply circuit having high-voltage electrical leads corresponding to said electrical contacts of said image intensifier tube; and
first and second modular housing portions respectively receiving said image intensifier tube and said high-voltage power supply circuit for interengaging with one another to define said image intensifier module, said first and said second modular housing portions each carrying respective high-voltage electrical connector features electrically connecting respectively with said high-voltage contacts and said high voltage leads and electrically connecting correspondingly with one another when said first and second housing portions interengage one another.

25. The image intensifier module of claim 24 wherein said first and second modular housing portions cooperatively define a high-voltage interface chamber within which said high-voltage electrical connector features connect correspondingly with one another.

26. The image intensifier module of claim 25 further including sealing means for sealingly isolating said high-voltage interface chamber from ambient when said modular housing portions are interengaged with one another.

27. The image intensifier module of claim 26 wherein said high-voltage electrical connector features includes corresponding male and female Pee-Wee high-voltage electrical connectors.

28. A night vision viewer comprising in combination:
a housing;
an objective lens through which light from a scene is received;
an image intensifier tube receiving said light from said scene via said objective lens and providing an intensified representative image, said image intensifier tube including high-voltage electrical contacts;
a high-voltage electrical power supply circuit including high-voltage electrical leads corresponding to said high-voltage electrical contacts of said image intensifier tube;
an eye piece into which a user of said night vision viewer may look to view said intensified representative image; and
a separable high-voltage electrical interface connecting said high-voltage electrical leads of said high-voltage power supply circuit separably to said electrical contacts of said image intensifier tube.

29. The night vision viewer of claim 28 wherein said viewer further includes a first and a second modular housing portions respectively receiving said image intensifier tube and said high-voltage power supply circuit and cooperatively defining an image intensifier module with said separable high voltage interface.

30. The night vision viewer of claim 29 wherein said first and said second modular housing portions nest axially together to form said image intensifier module.

31. The night vision viewer of claim 30 wherein said first and said second modular housing portions each carry respective parts of said separable high voltage interface for correspondingly connecting upon nesting of said housing portions.

32. The night vision viewer of claim 31 wherein said modular housing portions each carry respective male and female portions of high-voltage electrical connectors.

33. The night vision viewer of claim 32 wherein said electrical connectors are of the high-voltage Pee-Wee type.

34. The night vision viewer of claim 30 wherein said first and second modular housing portions cooperatively define a high-voltage interface chamber therebetween.

35. The night vision viewer of claim 34 wherein said modular housing portions carry cooperating sealing means for isolating said high-voltage interface chamber from ambient when said housing portions are nested with one another.

36. A method of electrically connecting an image intensifier tube having high-voltage electrical contacts with a high-voltage electrical power supply circuit having high-voltage electrical leads corresponding with said electrical contacts of said image intensifier tube, said method including the steps of:
providing a first modular housing portion receiving said image intensifier tube;
providing a second modular housing portion receiving said high-voltage power supply circuit and being engageable with said first housing portion in cooperable relation to define an image intensifier module;
providing on said first and second housing portions respective parts of a separable high-voltage interface structure for electrically connecting with said high-voltage contacts of said image intensifier tube and with said high-voltage leads of said high-voltage power supply circuit, and correspondingly connecting said contacts electrically with said leads upon engagement of said modular housing portions.

37. The method of claim 36 wherein said step of providing said separable high-voltage interface structure includes the steps of providing respective male and female portions of a high-voltage electrical connector, and disposing each respective male and female portion on a respective one of said first and second modular housing portions for electrical connection upon engagement of said housing portions.

38. The method of claim 37 further including the step of arranging said high-voltage connector portions to polarize said modular housing portions for engagement to form said image intensifier module only in a singular relative orientation.

* * * * *